US012748068B2

(12) United States Patent
Choi et al.

(10) Patent No.: US 12,748,068 B2

(45) Date of Patent: Sep. 29, 2026

(54) ION-SELECTIVE ELECTRODES WITH SENSING MEMBRANES COVALENTLY ATTACHED TO BOTH AN INERT POLYMER SUBSTRATE AND CONDUCTIVE CARBON CONTACT

(71) Applicants: Rosemount Inc., Shakopee, MN (US); Regents of the University of Minnesota, Minneapolis, MN (US)

(72) Inventors: Kwangrok R. Choi, Minneapolis, MN (US); Ye Lin, Eden Prairie, MN (US); Chad McGuire, Shakopee, MN (US); Philippe Buhlmann, Minneapolis, MN (US)

(73) Assignees: Rosemount Inc., Shakopee, MN (US); Regents of the University of Minnesota, Minneapolis, MN (US)

( * ) Notice: Subject to any disclaimer, the term of this patent is extended or adjusted under 35 U.S.C. 154(b) by 146 days.

(21) Appl. No.: 18/243,010

(22) Filed: Sep. 6, 2023

(65) Prior Publication Data

US 2024/0310317 A1 Sep. 19, 2024

Related U.S. Application Data

(60) Provisional application No. 63/451,741, filed on Mar. 13, 2023.

(51) Int. Cl.
*G01N 27/333* (2006.01)

(52) U.S. Cl.
CPC ................................ *G01N 27/3335* (2013.01)

(58) Field of Classification Search
None
See application file for complete search history.

(56) References Cited

U.S. PATENT DOCUMENTS 11,193,906 B1 12/2021 Anderson et al.

OTHER PUBLICATIONS

Abramova, N. et al. "Solid contact ion sensor with conducting polymer layer copolymerized with the ion-selective membrane for determination of calcium in blood serum", Analytica Chimica Acta 2016, 943, 50-57.

Anderson, E. L. et al. "Easy-to-Make Capillary-Based Reference Electrodes with Controlled, Pressure-Driven Electrolyte Flow" ACS Sensors 2021, 6, 2211-2217.

Anderson E. L. et al. "Solid-Contact lon-Selective and Reference Electrodes Covalently Attached to Functionalized Poly(ethylene terephthalate)" I. Chem. 2020, 92, 7621-7629.

Bakker, E. et al. "Carrier-Based lon-Selective Electrodes and Bulk Optodes. 1. General Characteristics" Chemical Reviews 1997, 97, 3083-3132.

Bakker, E. et al. "Modern Potentiometry" Angew Chem Int Ed Engl. 2007, 46, 5660-5668.

Bakker, E. et al. "Selectivity of Potentiometric Ion Sensors" Analytical Chemistry 2000, 72, 1127-1133.

(Continued)

*Primary Examiner* — J. Christopher Ball

(74) *Attorney, Agent, or Firm* — Westman, Champlin & Koehler, P.A.; Z. Peter Sawicki

(57) ABSTRACT

An electrochemical sensor with an ion-selective membrane that is attached through covalent chemical bonds to both an electrically non-conducting polymer substrate (electrode body) and an underlying ion to electron transducer.

24 Claims, 9 Drawing Sheets

Initial emf response (squares) and response after 6 months (circles) to pH for an ISE with a PDMA membrane (doped with ionophore and ionic sites) photografted onto a polypropylene-based electrode body and nanographite solid contact, relative to a free-flowing double-junction reference electrode.

(56) References Cited

OTHER PUBLICATIONS

Bobacka, J. "Potential Stability of All-Solid-State Ion-Selective Electrodes Using Conducting Polymers as Ion-to-Electron Transducers" Analytical Chemistry 1999, 71, 4932-4937.
Bobacka, J. et al. "Potentiometric Ion Sensors" Chemical Reviews 2008, 108, 329-351.
Camara, S. et al. "EPR and modelling studies of hydrogen-abstraction reactions relevant to polyolefin cross-linking and grafting chemistry" Organic and Biomolecular Chemistry 2003, 1, 1181-1190.
Catalá-Icardo, M. et al. "Photografted fluoropolymers as novel chromatographic supports for polymeric monolithic stationary phases" Talanta 2018, 187, 216-222.
Cho, J. D. et al. "Surface Modification of Polypropylene Sheets by UV-Radiation Grafting Polymerization" Journal of Applied Polymer Science 2006, 99, 1446-1461.
Choi, K. R. et al. "Solid-Contact pH Sensor with Covalent Attachment of Ionophores and Ionic Sites to a Poly(decyl methacrylate) Matrix" Analytical Chemistry 2021, 93, 16899-16905.
Crespo, G. A. "Thin Layer Ionophore-Based Membrane for Multianalyte Ion Activity Detection" Analytical Chemistry 2015, 87, 7729-7737.
Diaf, H. et al. "Revisiting thin film of glassy carbon" Physical Review Materials 2020, 4, 1-10.
Ding, J. et al. "AThree-Dimensional Origami Paper-Based Device for Potentiometric Biosensing" Angewandte Chemie—International Edition 2016, 55, 13033-13037.
Ding, J. et al. "Recent advances in potentiometric biosensors" TrAC—Trends in Analytical Chemistry 2020, 124, 115803.
Ferguson, S. A. et al. "Advances in electrochemical and optical polyion sensing: A review" Sensors and Actuators, B: Chemical 2018, 272, 643-654.
Fibbioli, M. et al. "Potential Drifts of Solid-Contacted Ion-Selective Electrodes Due to Zero-Current Ion Fluxes Through the Sensor Membrane", Electroanalysis 2000, 12, 1286-1292.
Gam-Derouich, S. et al. "A versatile route for surface modification of carbon, metals and semi-conductors by diazonium salt-initiated photopolymerization" Surface Science 2011, 605, 1889-1899.
Gao, W. et al. "A Solid-State Reference Electrode Based on a Self-Referencing Pulstrode" Angewandte Chemie—International Edition 2020, 59, 2294-2298.
Golec, B. et al. "Infrared absorption of gaseous benzoylperoxy radical C6H5C(O)OO recorded with a step-scan Fourier-transform spectrometer" Journal of Chemical Physics 2011, 135, DOI 10.1063/1.3664304.
Good, R. "Contact angle, wetting, and adhesion: a critical review" Journal of Adhesion Science and Technology 1992, 6, 1269-1302.
Guinovart, T., et al. "Potentiometric sensors using cotton yarns, carbon nanotubes and polymeric membranes" Analyst 2013, 138, 5208-5215.
Hambly, B. et al. "Evaluation, Pitfalls and Recommendations for the "Water Layer Test" for Solid Contact Ion-selective Electrodes", Electroanalysis 2020, 32, 781-791.
Heine, H. G. et al. "Photochemical a Cleavage and Free-Radical Reactions of Some Deoxybenzoins" Journal of Organic Chemistry 1974, 39, 691-698.
Heng, L. Y. et al. "Producing "Self-Plasticizing" Ion-Selective Membranes" Analytical Chemistry 2000, 72, 42-51.
Hong, K. H. et al. "UV-induced graft polymerization of acrylamide on cellulose by using immobilized benzophenone as a photo-initiator" European Polymer Journal 2009, 45, 2443-2449.
Hu, J. et al. "Ion-Selective Electrodes with Colloid-Imprinted Mesoporous Carbon as Solid Contact" Analytical Chemistry 2014, 86, 7111-7118.
Huggenberger, C. et al. "Self-Termination of Benzoyl Radicals to Ground- and Excited-State Benzil. Symmetry Control of a Radical Combination" Journal of Physical Chemistry 1980, 84, 3467-3474.
Ingold, K. U. et al. "Kinetic and Spectroscopic Studies on Acyl Radicals in Solution by Time-Resolved Infrared Spectroscopy" Australian Journal of Chemistry 1995, 48, 363-379.
Ivanko, I. et al. "Conjugated redox polymer with poly(3,4-ethylenedioxythiophene) backbone and hydroquinone pendant groups as the solid contact in potassium-selective electrodes", Sensors and Actuators, B: Chemical 2021, 329, 1-9.
Kerric, G. et al. "Nanostructured assemblies for ion-sensors: functionalization of multi-wall carbon nanotubes with benzo-18-crown-6 for Pb2+ determination", Journal of Materials Chemistry 2012, 22, 16611-16617.
Kimura, K. et al. "Neutral Carrier-Type Ion Sensors Based on Sol-Gel-Derived Membranes Incorporating a Bis(crown ether) Derivative by Covalent Bonding" Analytical Chemistry 1998, 70, 4309-4313.
Kumar, A. S. et al. "Selective covalent immobilization of catechol on activated carbon electrodes", Journal of Electroanalytical Chemistry 2010, 641, 131-135.
Kyomoto, M. et al. "Poly(ether-ether-ketone) orthopedic bearing surface modified by self-initiated surface grafting of poly(2-methacryloyloxyethyl phosphorylcholine)" Biomaterials 2013, 34, 7829-7839.
Lai, C. Z., et al. "Ion-Selective Electrodes with Three-Dimensionally Ordered Macroporous Carbon as the Solid Contact" Analytical Chemistry 2007, 79, 4621-4626.
Lee, Y. H. et al. "One-Step Synthesis of K-Selective Methacrylic-Acrylic Copolymers Containing Grafted Ionophore and Requiring No Plasticizer", Electroanalysis 2000, 12, 178-186.
Lin, S. Y. et al. "Infrared Absorption of Gaseous Benzoyl Radical C6H5CO Recorded with a Step-Scan Fourier-Transform Spectrometer" Journal of Physical Chemistry A 2012, 116, 6366-6374.
Lindner, E. et al. "Quality control criteria for solid-contact, solvent polymeric membrane ion-selective electrodes" Journal of Solid State Electrochemistry 2009, 13, 51-68.
Lugert-Thom, E. C. et al. "Cleaning of pH Selective Electrodes with Ionophore-doped Fluorous Membranes in NaOH Solution at 90C" Electroanalysis 2018, 30, 611-618.
Ma, H. et al. "A Novel Sequential Photoinduced Living Graft Polymerization" Macromolecules 2000, 33, 331-335.
Ocaña, C. et al. "Calcium-selective electrodes based on photo-cured polyurethane-acrylate membranes covalently attached to methacrylate functionalized poly(3,4-ethylenedioxythiophene) as solid-contact" Talanta 2018, 186, 279-285.
Oyama, N. et al. "Ion-Selective Electrodes Based on Bilayer Film Coating" Journal of Macromolecular Science: Part A—Chemistry 1988, 25, 1463-1473.
Papp, S. et al. "Ion-Selective Electrodes Based on Hydrophilic Ionophore-Modified Nanopores" Angewandte Chemie 2018, 130, 4842-4845.
Park, J. J. et al. "Functionalization of multi-walled carbon nanotubes by free radical graft polymerization initiated from photoinduced surface groups" Carbon 2010, 48, 2899-2905.
Parra, E. J. et al. "A potassium sensor based on non-covalent functionalization of multi-walled carbon nanotubes" Analyst 2013, 138, 2698-2703.
Reinhoudt, D. N. et al. "Development of Durable K+-Selective Chemically Modified Field Effect Transistors with Functionalized Polysiloxane Membranes" Analytical Chemistry 1994, 66, 3618-3623.
Rzewuska, A. et al. "Composite Polyacrylate-Poly(3,4-ethylenedioxythiophene) Membranes for Improved All-Solid-State Ion-Selective Sensors", Analytical Chemistry 2008, 80, 321-327.
Satchwill, T. et al. "Synthesis and Characterization of New Polyvinylchloride Membranes for Enhanced Adhesion on Electrode Surfaces" Journal of Electroanalytical Chemistry 1986, 202, 75-81.
Schneider, M. H. et al. "Benzophenone Absorption and Diffusion in Poly(dimethylsiloxane) and Its Role in Graft Photo-polymerization for Surface Modification" Langmuir 2011, 27, 1232-1240.
International Search Report and Written Opinion for International Application No. PCT/US2024/018698, dated Jul. 1, 2024.
Sotoudeh Sedaghat et al., "Improved performance of printed electrochemical sensors via cold atmospheric plasma surface modification," Journal of Materials Chemistry C, GB, vol. 10, No. 29, Jul. 8, 2022 (Jul. 8, 2022), pp. 10562-10573, XP093175289.
Kwangrok R. Choi et al., "Ion-Selective Electrodes With Sensing Membranes Covalently Attached to Both the Inert Polymer Sub-

(56) References Cited

OTHER PUBLICATIONS strate and Conductive Carbon Contact," Angewandte Chemie International Edition, Wiley-VCH, vol. 62, No. 28, May 11, 2023 (May 11, 2023), pp. 1-7, XP093173491.

Simon, B. W. et al. "Ion-Selective Sensors" Angew. Chem. internat. Edit. R. D. I, 1970, 9.

Sudholter, E. J. R. et al. "Ion-Sensing Using Chemically-Modified ISFETs", Sensors and Actuators 1989, 17, 189-194.

Sudholter, E. J. R. et al. "Modification of ISFETs by covalent anchoring of poly(hydroxyethyl methacrylate) hydrogel . Introduction of a thermodynamically defined semiconductor-sensing membrane interface" Analytica Chimica Acta 1990, 230, 59-65.

Ulbricht, M. et al. "Photo-induced graft polymerization surface modifications for the preparation of hydrophilic and low-protein-adsorbing ultrafiltration membranes" Journal of Membrane Science 1996, 115, 31-47.

Yang, Q. et al. "Surface Modification of Polypropylene Microporous Membranes with a Novel Glycopolymer" Chemistry of Materials 2005, 17, 3050-3058.

Zou, X. U. et al. "Ionic Liquid Reference Electrodes With a Well-Controlled Co(II)/Co(III) Redox Buffer as Solid Contact", Electroanalysis 2015, 27, 602-608.

Initial emf response (squares) and response after 6 months (circles) to pH for an ISE with a PDMA membrane (doped with ionophore and ionic sites) photografted onto a polypropylene-based electrode body and nanographite solid contact, relative to a free-flowing double-junction reference electrode.

Water layer test for ionophore-based ISEs with nanographite solid contact

Long-term stability of PDMA membranes

IR spectra of polypropylene sheets and poly(ethylene-co-tetrafluoroethylene) films: unmodified polypropylene sheets, polypropylene and poly(ethylene-co-tetrafluoroethylene) with photografted PDMA membranes, unmodified poly(ethylene-co-tetrafluoroethylene) films, and PDMA Polypropylene-based electrode bodies.

Images taken after forceful attempts to remove PDMA sensing membranes with tweezers unmodified glassy carbon (left) and on modified glassy carbon (right).

Image taken after forceful attempts of removal with tweezers. PDMA sensing membranes on unmodified polypropylene (left) and on modified polypropylene (right).

Image taken after forceful attempts of removal with tweezers. PDMA sensing membranes on unmodified polypropylene (left) and on modified polypropylene (right).i Image taken after forceful attempts of removal with tweezers. PDMA sensing membranes and nanographite solid contact on unmodified polypropylene (left) and on modified polypropylene (right).

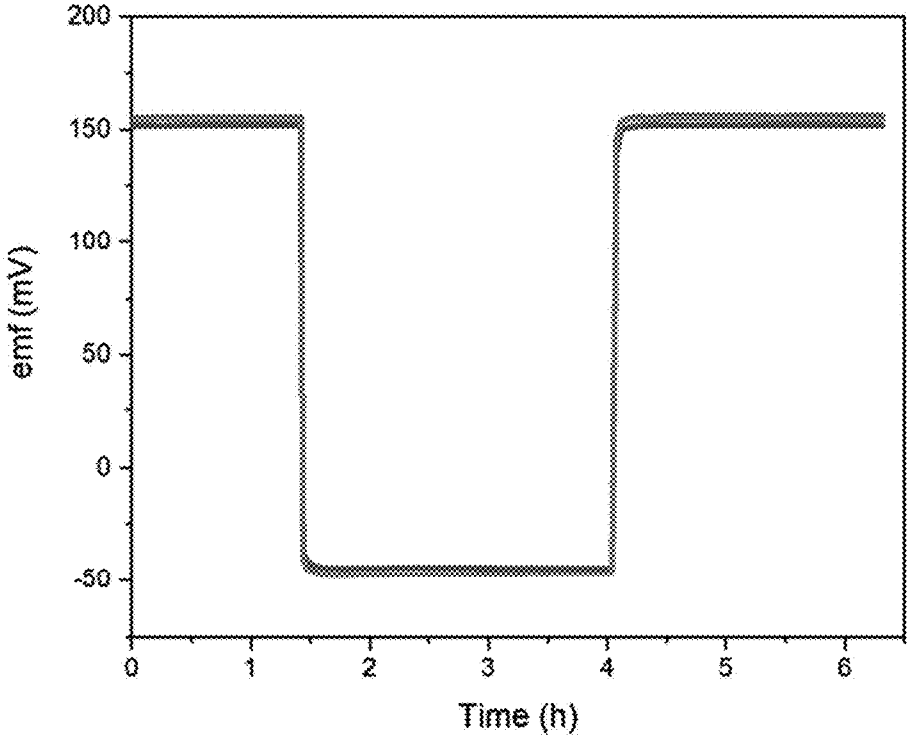

Water layer test for a gold/nanographite/PDMA ISE with direct attachment of the ionophore- and ionic site-doped PDMA membrane to both the underlying polypropylene-based electrode body and the nanographite solid contact after storage for 6 months in 0.1 M phosphate buffer (pH 7.1) solution. At t = 1.42 h, the 0.1 M phosphate buffer (pH 7.1) solution was exchanged to 0.1 M NaOH. At t = 4.03 h, the sample was switched back to 0.1 M phosphate buffer solution.

FIG. 10

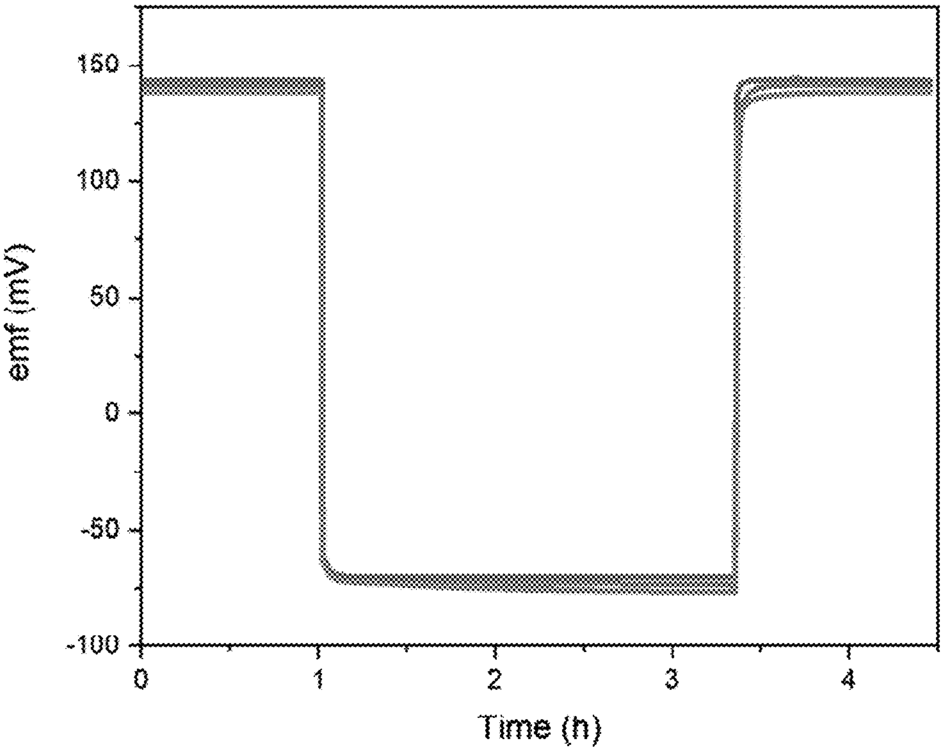

Water layer test for a gold/nanographite/PDMA ISE with direct attachment of the of the ionophore- and ionic site-doped PDMA membrane to both the underlying polypropylene-based electrode body and the nanographite solid contact after one day exposure to 10 wt% ethanol. At t = 1.01 h, the 0.1 M phosphate buffer (pH 7.1) solution was exchanged to 0.1 M NaOH. At t = 1.72 h, the sample was switched back to 0.1 M phosphate buffer solution.

FIG. 11

ION-SELECTIVE ELECTRODES WITH SENSING MEMBRANES COVALENTLY ATTACHED TO BOTH AN INERT POLYMER SUBSTRATE AND CONDUCTIVE CARBON CONTACT

BACKGROUND

The present disclosure relates to ion-selective electrodes (ISEs). and in particular to solid-contact ion-selective electrodes.

The use of ISEs is of interest to many clinical, environmental, and industrial applications. However, upon extended exposure to aqueous samples and under thermal and mechanical stress, the strength of adhesion between these membranes and the underlying substrate often weakens gradually. Eventually, this results in the formation of a water layer at the interface to the underlying electron conductor and in the delamination of the membrane from the electrode body, both major limitations to long-term monitoring.

The miniaturization and improvement of the lifetime of ISEs still pose considerable challenges. For example, pH glass electrodes—most commonly used to measure pH—have a high electrical resistance and are mechanically fragile. Also, pH glass electrodes and conventional ionophore-based ISEs with inner filling solutions are difficult to miniaturize. Efforts to overcome these drawbacks often involve ionophore-doped sensing membranes with solid contacts to underlying electron conductors such as conducting polymers, high-surface-area carbons (such as nanographite or mesoporous carbon), and hydrophobic redox buffers. The life span of these sensors can be improved by use of plasticizer-free polymers as the membrane matrix and the covalent attachment of ionophores or ionic sites to this matrix polymer. Another problem that often limits the lifetimes of such sensors is the formation of a water layer at the interface of the sensing membrane to the underlying electron conductor and the delamination of the sensing membranes from the electrode body. Screw caps and other mechanical devices can be used to prevent such delamination, but this makes miniaturization more difficult and for certain applications can increase the risk of air bubble trapping and damage to the sensing membranes by overtightening.

Because physical adhesion of sensing membranes to the underlying substrate is typically weak, several attempts have been made to covalently attach ISE membranes to underlying substrates. Harrison and co-workers used PVC membranes with hydroxyl groups and attached them to silicon oxide surfaces using $SiCl_4$. T. Satchwill, D. J. Harrison, Journal of Electroanalytical Chemistry 1986, 202, 75-81. Reinhoudt and co-workers functionalized the silicon oxide surface of ion-selective field effect transistor (ISFET) gates with a silylating reagent with terminal methacrylate groups, followed by covalent attachment of photopolymerizable sensing membranes. E. J. R. Sudholter, P. D. van der Wal, M. Skowronska-Ptasinska, A. van den Berg, D. N. Reinhoudt, Sensors and Actuators 1989, 17, 189-194. This method was later modified by incorporation of a hydrogel layer between the gate and the sensing membrane. D. N. Reinhoudt, J. F. J. Engbersen, Z. Brzózka, H. H. van den Viekkert, G. W. N. Honig, H. A. J. Hoiterman, U. H. Verkerk, Analytical Chemistry 1994, 66, 3618-3623; K. Kimura, T. Sunagawa, S. Yajima, S. Miyake, M. Yokoyama, Analytical Chemistry 1998, 70, 4309-4313; and E. J. R. Sudholter, P. D. van der Wal, M. Skowronska-Ptasinska, A. van den Berg, P. Bergveld, D. N. Reinhoudt, Analytica Chimica Acta 1990, 230, 59-65.

However, ISFETs of this type never became widely available, presumably because delamination of the sensing membrane could not be eliminated in a fully satisfactory manner. Bobacka and co-workers covalently attached polyacrylate-based sensing membranes to the conducting polymer pol(3,4-ethylenedioxythiophene) upon functionalization of the latter with methacrylate groups. C. Ocaña, N. Abramova, A. Bratov, T. Lindfors, J. Bobacka, Talanta 2018, 186, 279-285. Such attachment restricts the formation of a water layer between the sensing membrane and the conducting polymer, resulting in the stabilization of the potentiometric response. Unfortunately, it does not prevent the delamination of membranes from the underlying electrode bodies.

To prevent these problems without increasing the complexity of design with a mechanical attachment, photo-induced graft polymerization is used to simultaneously attach sensing membranes covalently both to a high surface area carbon as ion-to-electron transducer and to inert polymeric electrode body materials (i.e., polypropylene and poly(ethylene-co-tetrafluoroethylene)). The sensors provide a high reproducibility (standard deviation of E0 of 0.2 mV), long-term stability (potential drift of 7 μV/h over 260 h), and resistance to sterilization in an autoclave (at 121° C. and 2.0 atm for 30 min). For this work, a covalently attached $H^+$ selective ionophore was used to prepare pH sensors with advantages over conventional pH glass electrodes, but use of other ionophores makes this approach suitable to the fabrication of ISEs for a variety of analytes.

Furthermore, sensor membranes were chemically attached to an inert polymeric sensor platform material. Specifically, polyacrylate-based sensing membranes were covalently attached to surface-modified poly(ethylene terephthalate) and poly(ethylene-co-cyclohexane-1,4-dimethanol terephthalate) by E. L. Anderson, S. A. Chopade, B. Spindler, A. Stein, T. P. Lodge, M. A. Hillmyer, P. Bühlmann. These sensors showed no delamination of membranes from the underlying substrate in both long-term measurements and severe mechanical stress tests, but the surface modification of the substrates required a multistep synthesis and the sensing membranes were not covalently attached to the underlying electron conductor.

SUMMARY

This disclosure describes an electrochemical sensor comprising an ion-selective membrane, an electrically non-conducting polymer substrate or electrode body, and an underlying electron conductor, the ion-selective membrane being attached through covalent chemical bonds to the electrically non-conducting polymer substrate or electrode body and, the underlying electron conductor.

This disclosure further describes the sensor wherein the covalent chemical bonds are characterized by photoinitiated surface functionalization and subsequent photoinitiated or thermally initiated graft polymerization.

This disclosure further describes the sensor wherein the covalent chemical bonds between the ion-selective membrane and the inert polymeric electrode body material and the underlying electron conductor are characterized by generation of radicals by a plasma.

This disclosure further describes the sensor wherein the radicals are generated by the plasma treatment comprising pretreatment of the electrically non-conducting polymer substrate or electrode body and the underlying electron conductor with a plasma comprising either argon, helium, oxygen, hydrogen peroxide, hydrogen, chlorine, BCl3, HBr, tetrafluoromethane, fluoroform, CO2, SF6, a fluorocarbon, or a mixture of two thereof.

This disclosure further describes the sensor wherein a subsequent exposure of the electrically non-conducting polymer substrate or electrode body and the underlying electron conductor to oxygen or the ambient atmosphere, created peroxide and hydroperoxide functional groups on surfaces thereof.

This disclosure further describes the sensor wherein the covalent chemical bonds are characterized by a graft-polymerization having been formed by a vapor phase of a monomer having been introduced into the plasma whereby the monomer having formed into a polymer, the polymer being covalently bonded to the electrically non-conducting polymer substrate or electrode body and the underlying electron conductor.

This disclosure further describes the sensor wherein the ion-selective membrane is doped with either (i) an ionophore that is selective for H+ and contains a primary, secondary, or tertiary amine, or a heterocyclic aromatic hydrocarbon being either a pyridine, a quinoline, or a phenanthrene, or (ii) an ionophore with selectivity for a mono- or multivalent ion being either Li+, K+, Na+, Mg2+, Ca2+, Cl—, SO42—, carbonate, or phosphate.

This disclosure further describes the sensor wherein an ion exchange capacity in the ion-selective membrane is characterized by having been doped with an ionic site that contains a tetraphenylborate group, a sulfonate group, or a sulfonylimide group.

This disclosure further describes the sensor wherein the ion-selective membrane comprises an alkyl methacrylate homopolymer, an alkyl acrylate homopolymer, or a copolymer of two or more alkyl methacrylates or acrylates, comprising no crosslinker or comprising a crosslinker.

This disclosure further describes the sensor characterized by showing no water layer effect.

This disclosure further describes the sensor wherein the ion-selective membrane comprises a polymeric material, the polymeric material comprising a polycarbonate, polystyrene, polyurethane, polyolefin, silicone, polyamide, polyester, polyether, polyimide, polysulfide, polycarbonate, polyacetal, polymethacrylate or polyacrylate, polyphenylene sulfide, polypropylene, polyethylene, poly(ethylene-co-tetrafluoroethylene), poly(tetrafluoroethylene), poly(vinylchloride), polyvinylidene chloride, polyvinyl acetate, polyacrylonitrile, polyvinyl fluoride, or polyvinylidene fluoride.

This disclosure further describes a reference electrode comprising an ionic liquid doped reference membrane, an inert plastic substrate, and an underlying electron conductor, the ionic liquid doped reference membrane being attached through covalent chemical bonds to both the inert plastic substrate and the underlying electron conductor.

This disclosure further describes a reference electrode wherein the covalent chemical bonds are characterized by photoinitiated graft polymerization.

This disclosure further describes a reference electrode wherein the covalent chemical bonds are characterized by radicals formed by a plasma.

This disclosure further describes a reference electrode characterized by pretreatment of the inert plastic substrate and the underlying electron conductor with an argon, helium or oxygen plasma and subsequent exposure to oxygen or ambient atmosphere, peroxide and hydroperoxide functional groups formed on the surfaces thereof.

This disclosure further describes a reference electrode the ionic liquid doped reference membrane comprising a polymer having been formed by the plasma and wherein the plasma having been comprised of a monomer in vapor phase in the plasma and/or other gases that were converted in reactive fragments to form the covalent chemical bonds.

This disclosure further describes a reference electrode wherein the covalent chemical bonds are characterized by radicals formed by thermal polymerization.

This disclosure further describes a reference electrode wherein the ionic liquid doped reference membrane comprises a polymeric material, the polymeric material comprising a polycarbonate, polystyrene, polyurethane, polyolefin, silicone, polyamide, polyester, polyether, polyimide, polysulfide, polycarbonate, polyacetal, polymethacrylate or polyacrylate, polyphenylene sulfide, polypropylene, polyethylene, poly(ethylene-co-tetrafluoroethylene), poly(tetrafluoroethylene), poly(vinylchloride), polyvinylidene chloride, polyvinyl acetate, polyacrylonitrile, polyvinyl fluoride, or polyvinylidene fluoride.

This disclosure further describes a reference electrode characterized by showing no water layer effect.

BRIEF DESCRIPTION OF THE DRAWINGS

FIG. 10 is a graphical view of a water layer test for a gold/nanographite/PDMA ISE.

FIG. 11 is a graphical view of a water layer test for a gold/nanographite/PDMA.

DETAILED DESCRIPTION

Figure 1:
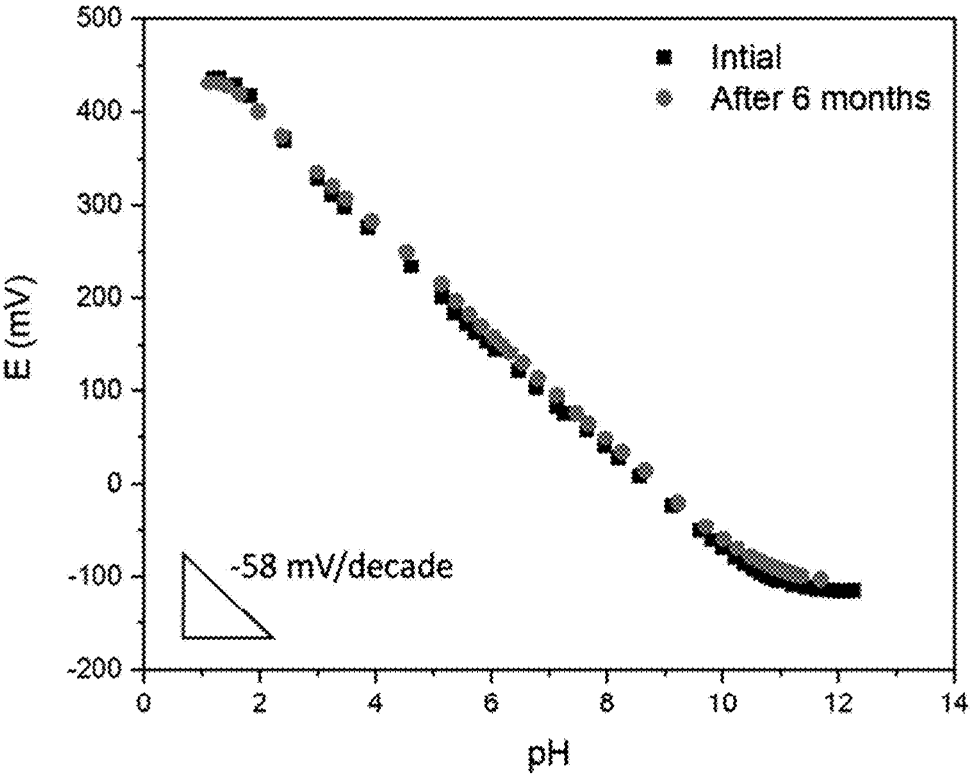
FIG. 1 is a graphical view of Initial emf response (squares) and response after 6 months (circles) to pH for an ISE with a PDMA membrane (doped with ionophore and ionic sites).

This disclosure describes the simultaneous covalent attachment of ISE membranes to both inert polymeric electrode bodies and the underlying carbon conductor. While there is precedence for the covalent attachment of sensing membranes to conducting polymers as electron conductor and inert polymeric substrates, the covalent attachment of the sensing membrane to both the inert body polymer and the ion-to-electron transducer has not been shown before. As an example both nanographite (surface area 250 m2/g) and glassy carbon are used as electron conductors and both polypropylene and poly(ethylene-co-tetrafluoroethylene) are used as electrode body materials. The use of other polymeric bodies are within the scope of this disclosure. Notably, these electrode body materials are not only widely used in industry but also have good mechanical, temperature, and chemical resistance suitable for industrial grade sensor bodies. Further electrode body materials suitable for use as electrode body materials include but not limited to polycarbonate, polystyrene, polyurethane, polyolefin, silicone, polyamide, polyester, polyether, polyimide, polysulfide, polycarbonate, polyacetal, polymethacrylate or polyacrylate, polyphenylene sulfide, poly(tetrafluoroethylene), poly(vinylchloride), polyvinylidene chloride, polyvinyl acetate, polyacrylonitrile, polyvinyl fluoride, or polyvinylidene fluoride.

The surface modification and graft polymerization were both achieved by ultraviolet (UV) irradiation. For the first step (Step 1), a THF solution of the photoinitiator 2,2-dimethoxy-2-phenylacetophenone was deposited on the carbon-based conductor surfaces and adjacent inert polymer of the electrode body. Upon UV irradiation, a photo-reduction reaction (hydrogen abstraction) between the photo-initiator and the surface C—H bonds of polypropylene or poly (ethylene-co-tetrafluoroethylene results in surface localized radicals that subsequently combine with benzoyl radicals formed from the photoinitiator, leading to the formation of benzoyl groups on these surfaces. In the case of the carbon-based conductor, direct reaction of the benzoyl radical with sp2 hybridized carbon is likely the dominant reaction. In the second step (Step 2), a solution comprising besides photoinitiator also decyl methacrylate and crosslinker is deposited on the functionalized surfaces. Subsequent UV irradiation cleaves the bonds between the surface-attached benzoyl groups homolytically and initiates graft polymerization of decyl methacrylate, resulting in polymer chains that are chemically bonded onto the substrates. The success of this photo-induced graft polymerization is supported by attenuated total reflectance Fourier transform infrared (ATR-FTIR) spectroscopy, contact angles, weight measurements, and peeling tests, as discussed in the following.

Photo-induced surface modification, shown below for polypropylene. 1st step: attachment of photoinitiator to surface. 2nd step: monomer grafting 1st step: Surface initiator

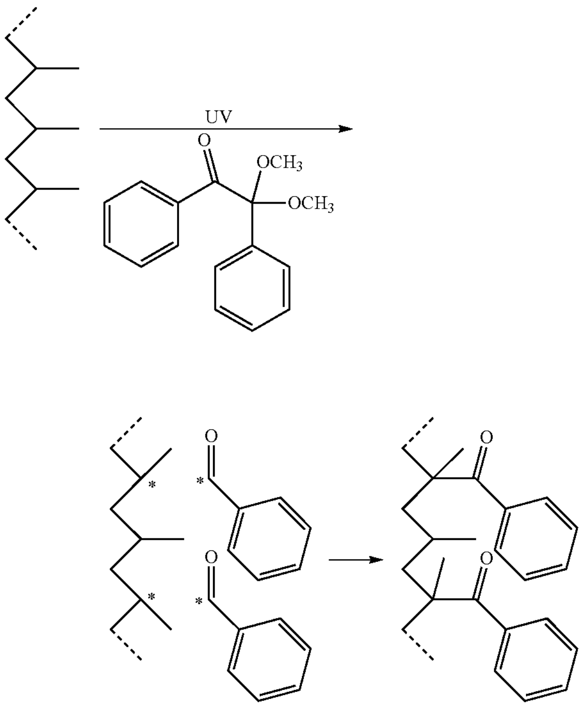

-continued

2nd step: Graft monomer

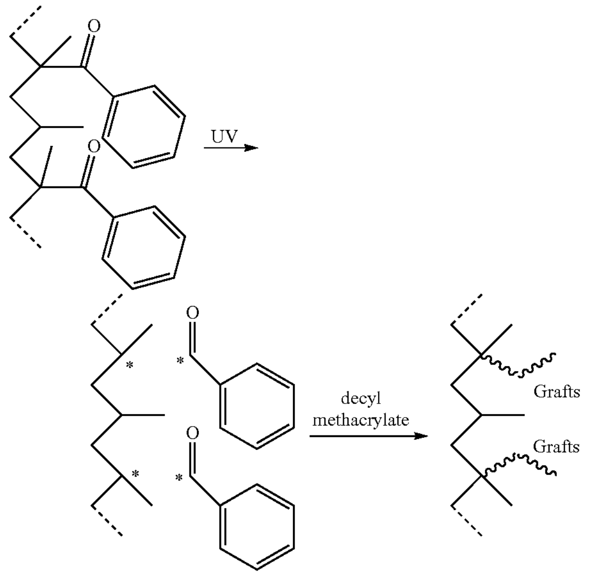

Figure 4:
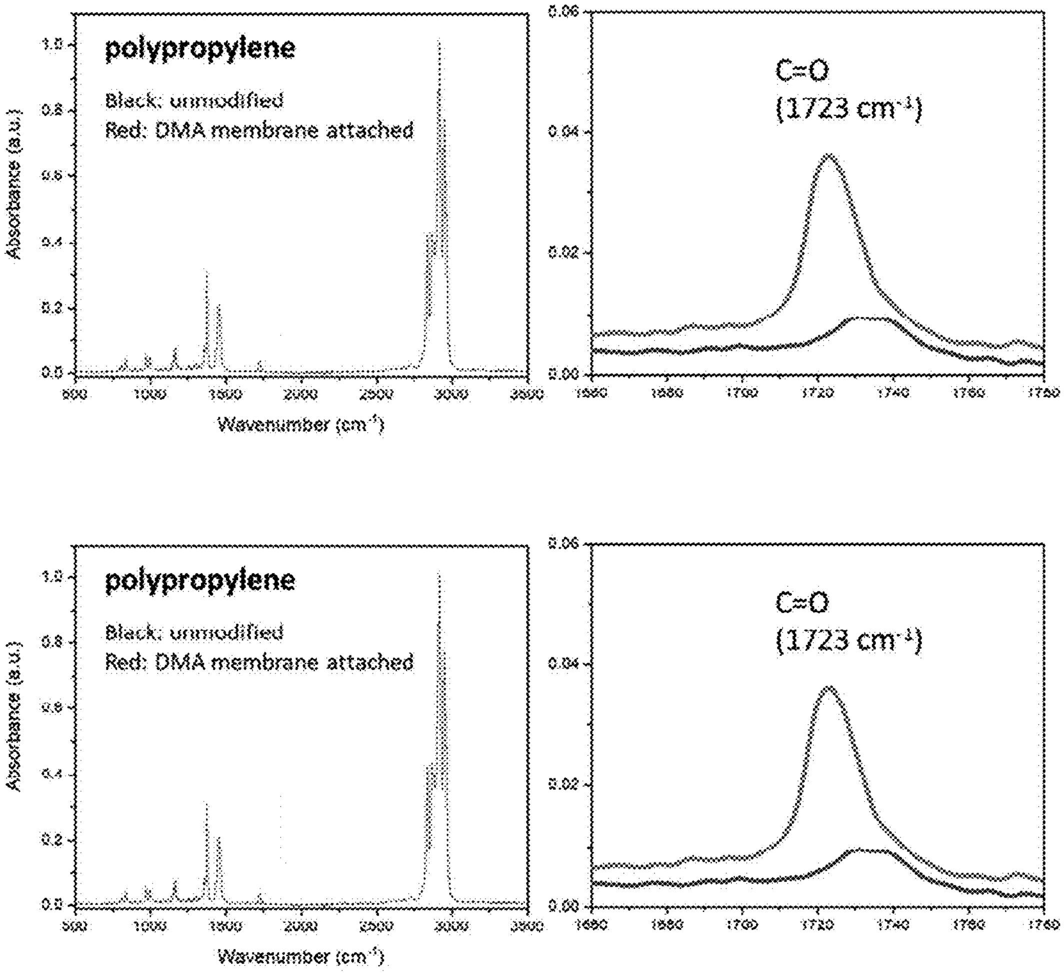
FIG. 4 is a graphical view of IR spectra of polypropylene sheets and poly(ethylene-co-tetrafluoroethylene) films.

ATR-FTIR spectra show for both polypropylene and poly(ethylene-co-tetrafluoroethylene) modified by surface photografting a C═O stretch vibration characteristic for the ester group of poly(decyl methacrylate) (PDMA)[40](see FIG. 4). Surface photografting is also confirmed by contact angles, which were found to be 1130 and 107° for the unmodified polypropylene and poly(ethylene-co-tetrafluoroethylene) substrates, respectively, but decreased for both substrates to 760 upon photografting of the PDMA membrane (see Table 2). This is consistent with the more hydrophilic nature of the methacrylate polymer as a result of its ester groups. Incorporation of the crosslinker into the grafted PDMA is evident from differential scanning calorimetry (DSC). Compared to non-crosslinked PDMA membranes, the glass transition temperature of crosslinked PDMA.membranes increased by 77° C. from −65° C. to 12° C., as it is expected for the incorporation of crosslinker into a polymethacryalate.

The efficiency of graft polymerization was calculated as the ratio of the experimental weight of the grafted membranes and the total amount of polymerizable membrane components used for their preparation (i.e., the decyl methacrylate monomer, the crosslinker, and, if applicable, ionophore). As Table 1 shows, graft polymerization efficiencies of as high as 81% can be achieved with little optimization. The remainder of polymerizable components is lost (in the form of monomers or oligomers) due to evaporation during the photopolymerization or when the membranes are washed with solvent (1 mL THF or methanol) following the polymerization.

Importantly, addition of the H+-selective and polymerizable ionophore 2-(diisopropylamino)ethyl methacrylate and ionic sites (tetrakis(pentafluorophenyl)borate in the form of a K+ salt) into the solution of decyl methacrylate and crosslinker did not interfere with the photoinitiated polymerization (see Table 1) and the covalent attachment onto underlying substrates. Suitable ionophores include without limitation either (i) an ionophore that is selective for H+ and contains a primary, secondary, or tertiary amine, or a heterocyclic aromatic hydrocarbon being either a pyridine, a quinoline, or a phenanthrene, or (ii) an ionophore with selectivity for a mono- or multivalent ion being either Li+, K+, Na+, Mg2+, Ca2+, Cl—, SO42—, carbonate, or phosphate. Electroneutrality in the ion-selective membrane may be achieved by doping with an ionic site that contains a tetraphenylborate group, a sulfonate group, or a sulfonylimide group.

Figure 6:
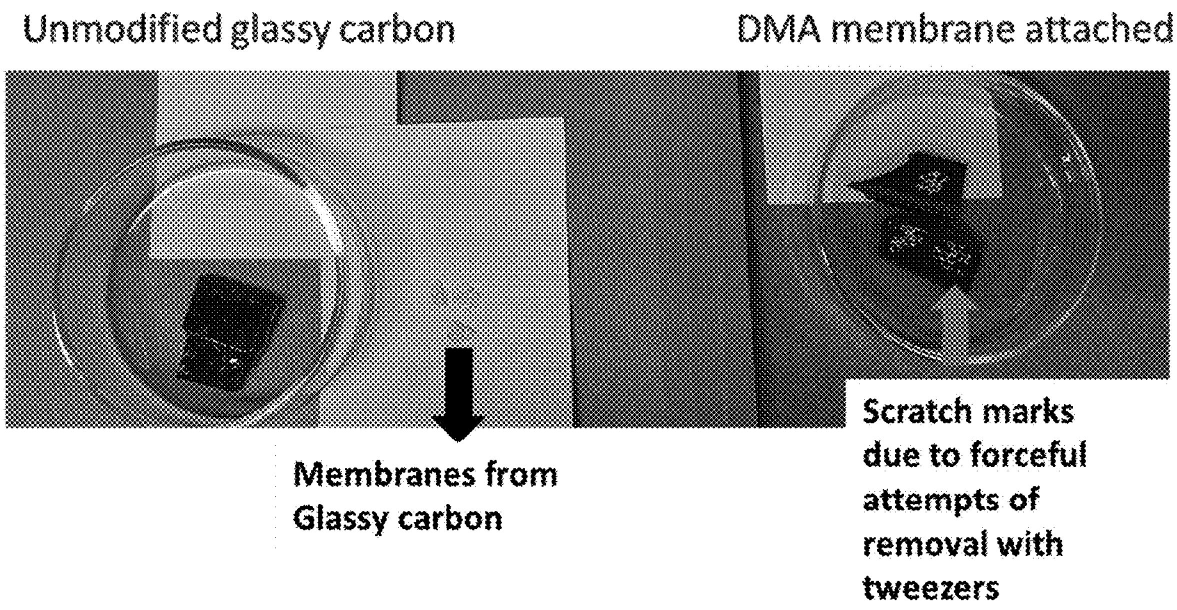
FIG. 6 is a pictorial view of PDMA sensing membranes.
Figure 7:
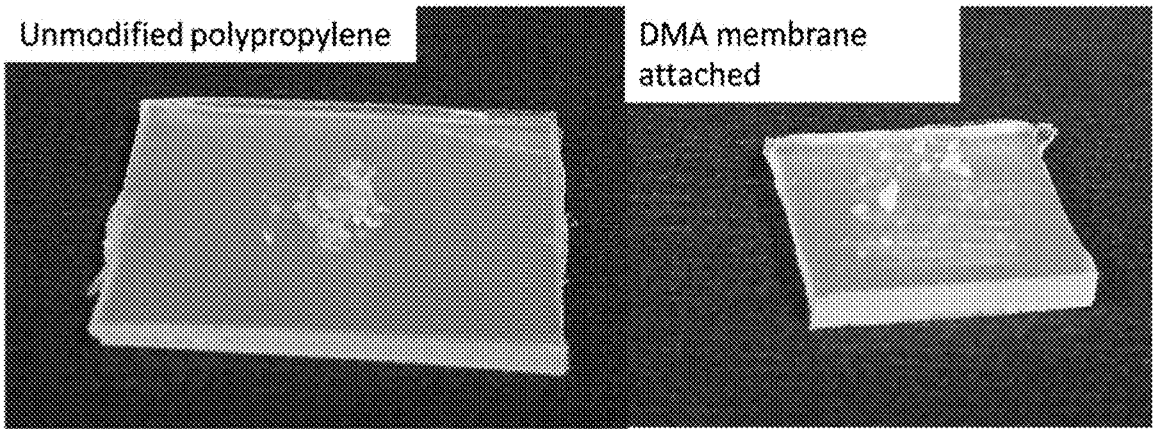
FIG. 7 is a pictorial view of PDMA sensing membranes.
Figure 8:
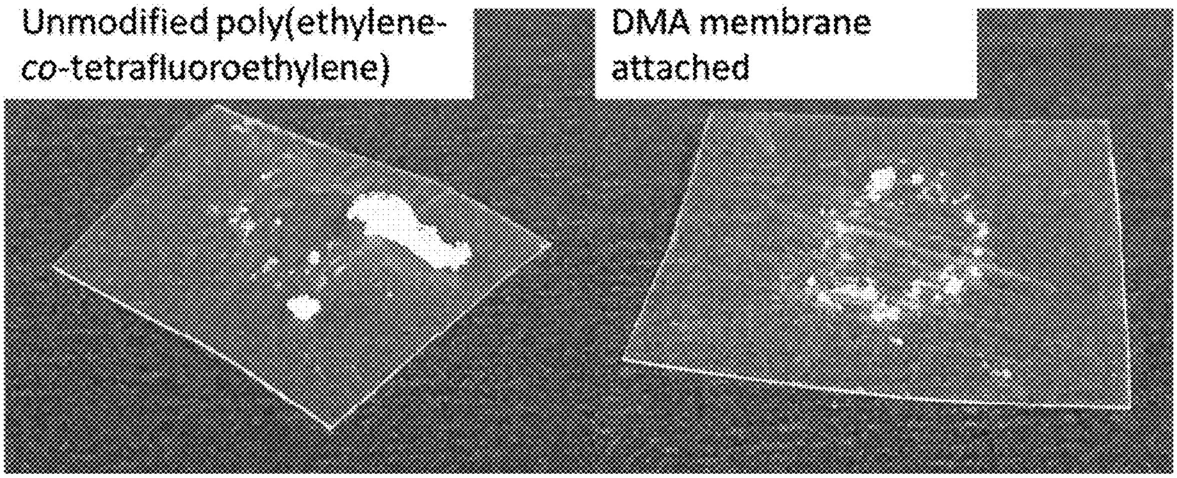
FIG. 8 is a pictorial view of PDMA sensing membranes.
Figure 9:
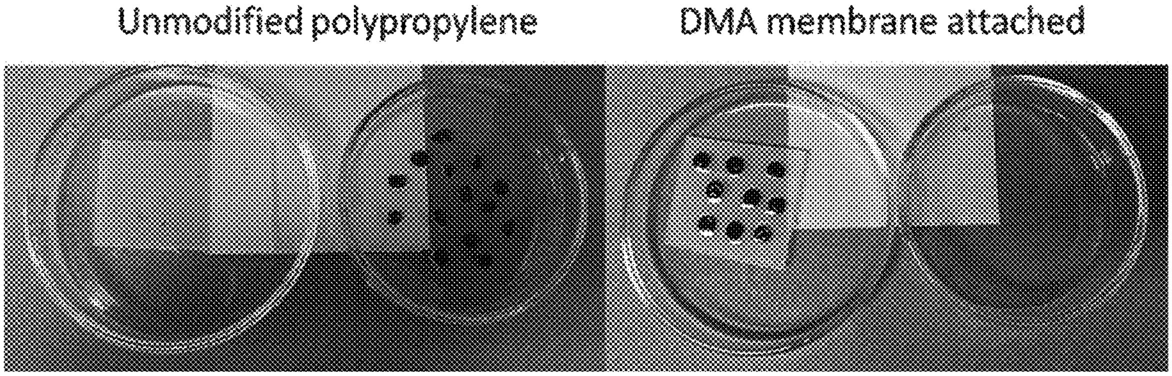
FIG. 9 is a pictorial view of PDMA sensing membranes.

To confirm that the 2-step process for photografting indeed results in the covalent attachment of PDMA membranes to the underlying substrates and electrical contacts, peeling tests were performed (see FIG. 6-9). While we used nanographite as the solid contact and electron conductor for the preparation of potentiometric devices, as shown below, nanographite was not suitable for peeling tests because of its powdery nature. Therefore, we used for this purpose glassy carbon plates instead (FIG. 6). These plates are completely flat and have a fully sp2-bonded fullerene-related structure that is chemically very similar as nanographite.

PDMA membranes were grafted to polypropylene (FIG. 7), poly(ethylene-co-tetrafluoroethylene) (FIG. 8), and glassy carbon plates placed onto polypropylene sheets (FIG. 9) in two different ways. On one hand, both were photografted using the complete 2-step procedure described above. On the other hand, controls were performed in which the first step with the attachment of the photoinitiator to the surface was omitted, and only photopolymerization of decyl methacrylate, crosslinker and photoinitiator was performed without prior attachment of photoinitiator to the surface. Then, all four types of substrates thus obtained were submersed into phosphate buffer (pH=7.1). After 7 days, all PDMA membranes formed on unmodified polypropylene, poly(ethylene-co-tetrafluoroethylene) or glassy carbon (i.e., by omitting the first step of the grafting procedure) could be removed with little effort using tweezers. On the other hand, PDMA membranes attached onto polypropylene, poly(ethylene-co-tetrafluoroethylene) or glassy carbon with the full 2-step procedure could not be removed, consistent with the successful covalent attachment of the PDMA membranes onto the two inert polymer substrates and the glassy carbon. Even very forceful attempts to remove the PDMA resulted only in scratch damage to the PDMA but no membrane delamination.

The covalent attachment of the sensing membranes to the polymer and carbon conductor having been confirmed, potentiometric devices were prepared and characterized. For this purpose, gold-coated stainless-steel rods were molded into polypropylene bodies, exposing the gold-coated rod at one end of the body at the bottom of a cavity designed to hold the nanographite and the ion-selective membrane. In FIG. 1, Initial emf response (squares) and response after 6 months (circles) to pH for an ISE with a PDMA membrane (doped with ionophore and ionic sites) photografted onto a polypropylene-based electrode body and nanographite solid contact, relative to a free-flowing double-junction reference electrode are shown. The pH was adjusted by the addition of 1.0 M HCl or 1.0 M NaOH to 10 mM sodium phosphate buffer solution (pH 7.1). The pH shown on the x-axis was measured using a pH glass electrode.

To prevent ionophore leaching into samples from limiting sensor lifetime, 2-(diisopropylamino)ethyl methacrylate was included into the photografting solution. Because of its methacrylate group, this ionophore is incorporated into the PDMA polymer backbone in the course of the photoiniated polymerization. The ionic site tetrakis(pentafluorophenyl) borate, which is required to provide membrane permselectivity for cations, was included into the photografting solution in a 1 to 3 molecular ratio to the ionophore. No attempt was made to covalently attach the ionic sites to the PDMA backbone, as it has been shown that ISEs with both the ionophore and the ionic sites covalently attached exhibit larger electrical resistances and excessive response times and are not suitable for potentiometric analysis.

After overnight conditioning in 10 mM pH 7.1 sodium phosphate buffer, the response of these electrodes to pH was tested in 10.0 mM phosphate buffer solutions by pH adjustment with aliquots of 1 M NaOH and HCl. Three identically prepared electrodes showed a slope of −58.5±1.2 mV/decade and a working range from pH 1.4 to pH 9.7 (see FIG. 1). The logarithmic selectivity coefficients log 〚K_(H,Na)^pot〛, log 〚K_(H,K)^pot〛, and log 〚K_(H,Li)^pot〛 of these membranes were −10.4±0.1, −9.8±0.1, and −10.7±0.1, respectively. These values are close to but slightly different to what was previously reported for the same ionophore covalently attached to PDMA membranes but without covalent attachment of the PDMA membrane to the inert polymer substrate and nanographite as solid contact (see Table 3). The reduction in selectivity is most notable for K+, with log 〚K_(H,K)^pot〛 increasing from −10.7 to −9.8, while log 〚K_(H,Na)^pot〛 and log 〚K_(H,Li)^pot〛 only increased by 0.6 and 0.4. This difference may be related to use of photoinitiator in Step 1 of the membrane fabrication, in which surface-attached benzoyl groups are formed, or the higher photoinitiator concentration used in Step 2 of this work (1.5 wt %) as compared to our earlier work (0.9 wt %). While there appears to be some room for optimization, this shows that the photoinitiated grafting of PDMA gives well-functioning ISEs.

Figure 2:
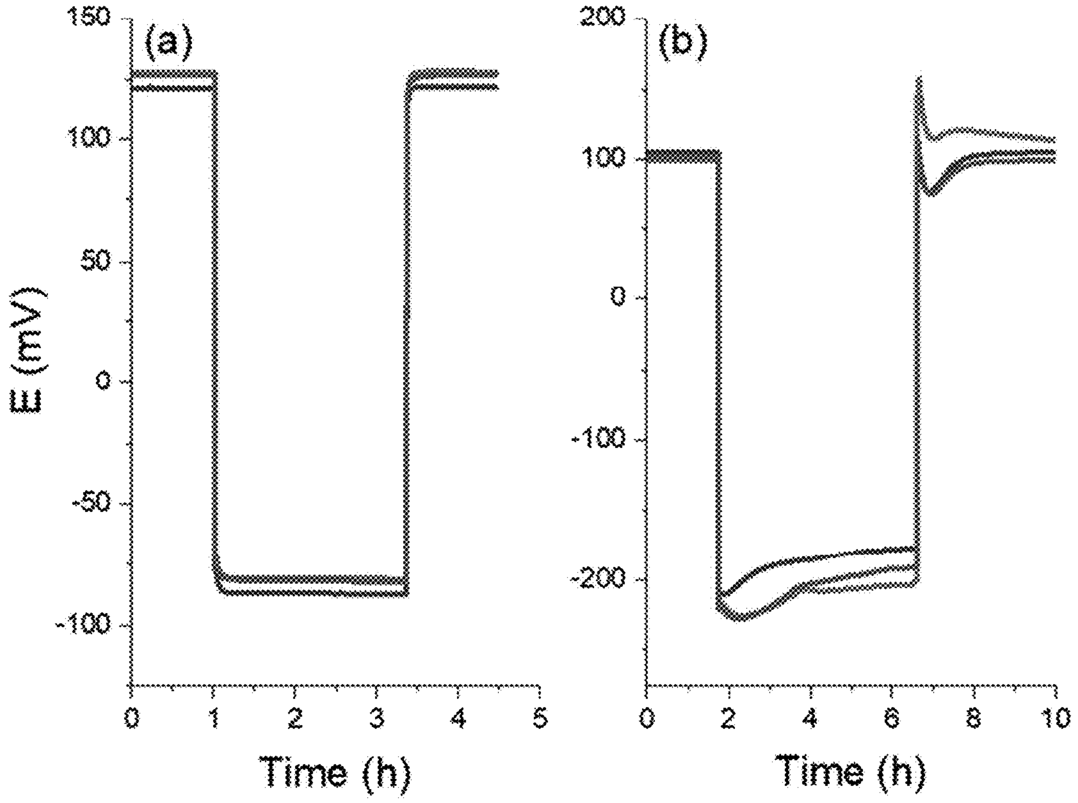
FIG. 2 is a graphical view of a water layer test for ionophore-based ISEs with nanographite solid contact.

It is well known that formation of a thin water layer between the polymeric membrane and the solid contact of an ISE causes not only drifting potentials and a poor emf repeatability but also ultimately delamination of the membrane. To assess whether such a water layer is formed in the case of photografted PDMA membranes, we used the well-established water layer test. M. Fibbioli, W. E. Morf, M. Badertscher, N. F. De Rooij, E. Pretsch, Electroanalysis 2000, 12, 1286-1292; B. Hambly, M. Guzinski, B. Pendley, E. Lindner, Electroanalysis 2020, 32, 781-791. As shown by FIG. 2 (a), when using the 2-step photografting procedure, no such drift was observed for the membranes that were covalently attached to the electrode bodies and the nanographite solid contact. On the other hand, the presence of a water layer was confirmed when the first step of photografting was omitted, resulting in PDMA membranes not covalently attached to electrode body and solid contact. This confirmed the importance of the attachment of the photoinitiator to these surfaces in the first step of photografting.

To assess the improvement of long-term durability provided by the covalent attachment of the H+ selective membranes, three tests were performed. First, three electrodes were stored in pH-buffer solutions for 6 months. Then, their response to pH and selectivity were measured, and a water layer test was once again performed. The three membranes maintained theoretically expected Nernstian slopes (−58.4 mV±0.8 mV/decade) with a linear response range from pH 1.4 to 10.0 and no changes in selectivity coefficients when stored for 6 months in 10 mM sodium buffer solution (pH 7.1; see Table 3). Moreover, the water layer test demonstrated that no water layer had formed over this time period (see FIG. 10). In contrast, PDMA membranes that were not covalently attached to the polypropylene and nanographite failed the water layer test already after 5 weeks exposure to buffer solution as shown in FIG. 2 which shows a water layer test for ionophore-based ISEs with nanographite solid contact: (a) PDMA membrane photografted onto polypropylene-based electrode body and nanographite solid contact, after autoclave test. (b) PDMA membrane not covalently attached to the polypropylene-based electrode body and nanographite solid contact, after 5 weeks exposure to buffer solution. At t=1.01 h for (a) or t=1.72 h for (b), the 0.1 M phosphate buffer (pH 7.1) solution was replaced by 0.1 M NaOH. At t=3.36 h for (a) and t=6.61 h for (b), electrodes were returned into 0.1 M phosphate buffer solution.

As a second test to assess the covalent attachment of the sensing membrane, the electrodes were exposed to high pressure (1500 Torr) and heat (121° C.) in an autoclave. Substantially higher temperatures would damage the polypropylene-based electrode bodies, as commercial isotactic propylene melts in the range of 160 to 166° C., while crosslinked methacrylates do not exhibit melting and only decompose at much higher temperatures.

In separate experiments, electrodes were also exposed to 10 wt. % ethanol solutions for 1 day. The response slopes and selectivities remained unchanged after both the autoclave and the ethanol treatment (see Table 3), and a water layer was not observed either (see FIG. 11). This confirms that covalent attachment of the sensing membrane to electrodes is also attractive when ISEs are exposed to high temperatures or organic solvents either during measurements or cleaning.

Figure 3:
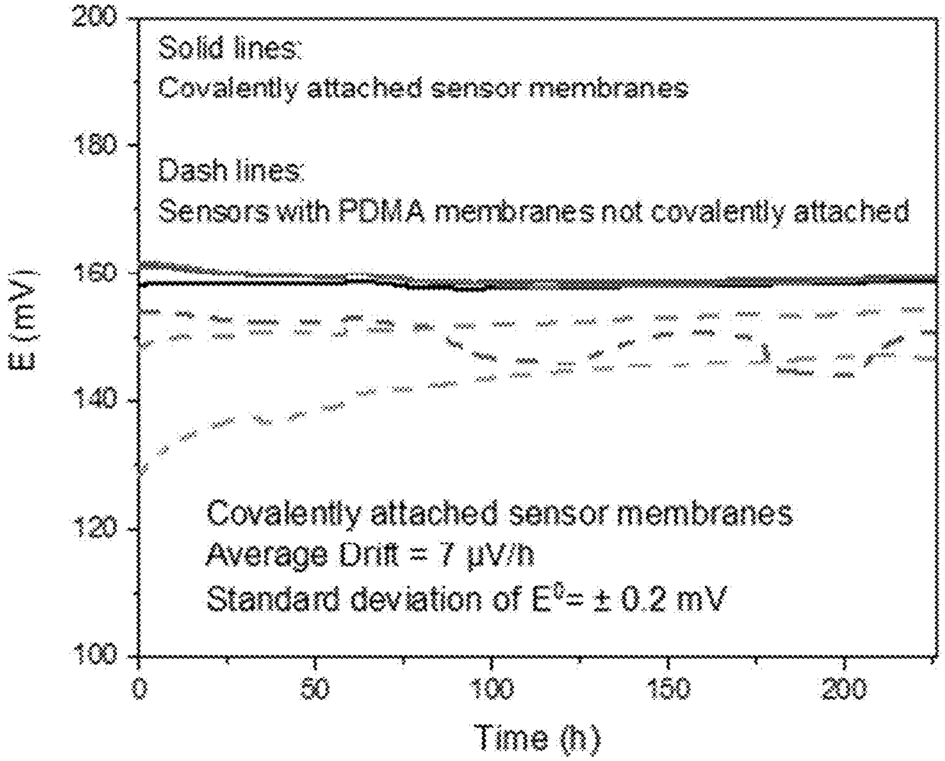
FIG. 3 is a graphical view of long-term stability of PDMA membranes.

The third durability test was a long-term emf drift test. For this purpose, we used a capillary-based reference electrode (prepared as reported in E. L. Anderson, B. K. Troudt, P. Buhlmann, ACS Sensors 2021, 6, 2211-2217) to minimize the drift contributed by the reference electrode. As FIG. 3 shows, all three electrodes prepared with the two-step photografting process showed very low drifts (7 μV/h). Consistent with the prior tests, no water layer was detected after 260 h, consistent with the other two tests. Moreover, the standard deviation of the y intercepts of the calibration curve, E0, of the three electrodes was only ±0.2 mV after the long-term stability test. Notably, the small variability in the standard deviation of E0 standard deviation (mV) and the drifts (μV/h) of these electrodes are among the best observed to date for solid-contact ISEs.

FIG. 3 shows long-term stability of PDMA membranes directly attached to the underlying polypropylene-based electrode body and nanographite solid contact, as measured relative to a capillary-based reference electrode in 1.0 mM phosphate buffer solution in a temperature-controlled Faraday cage at 32° C.

In summary, the simultaneous attachment of ISE membranes to both polymeric electrode bodies and the underlying electron conductor provides mechanically robust sensors that exhibit excellent long-term stabilities. The covalent photografting inhibits formation of water layers at the interface of the electrode body and sensing membrane, preventing membrane delamination, and it counteracts the formation of a water layer at the interface to the carbon solid contact, preventing emf signal drift. It is within the present disclosure that the approach described herein can be adapted to detect other ions by using different ionophores, provided that the ionophore is compatible with the photopolymerization. The approach appears particularly suitable for wearable and implantable sensors that require long term stability with minimal or no recalibration.

Plasma irradiation methods were also applied to graft sensor membranes to both electrode bodies and solid contacts made of a conductive carbon material. The plasma provided 5 times faster efficiency than ultraviolet (UV) treatment. Argon, helium, and oxygen plasmas produces radicals on the polymer surface. The new generated radicals initiated the polymerization of monomers, resulting in graft polymer chains chemically bonded onto the substrates. Other suitable plasmas include without limitation, hydrogen peroxide, hydrogen, chlorine, BCl3, HBr, tetrafluoromethane, fluoroform, CO2, SF6, a fluorocarbon, or mixtures thereof.

Using one method, the components of the sensing membrane were deposited onto polypropylene and poly(ethylene-co-tetrafluoroethylene) platform substrates, and those were then exposed to an argon or helium plasma. The plasma generated radicals in the deposited sensing material and on the substrate surface, which led to graft-polymerization of the sensing membrane to the substrate.

Using another method, the polymeric substrates were pretreated with an argon or helium or oxygen plasma and subsequently exposed to oxygen or the ambient atmosphere, creating peroxide and hydroperoxide functional groups on the surface. The monomeric components of the sensing membranes were then deposited onto these substrates and radical polymerization was induced by UV-irradiation or thermal treatment, graft-polymerizing the sensing membranes onto the substrates. The plasma parameters (power, pressure, and flow rate) were used to control the polymerization efficiency and thickness of the resulting sensor membranes. High power values may damage the ion-selective membrane and polymer electrode body.

The simultaneous attachment of ISE membranes to both polymeric electrode bodies and the underlying electron conductor provides mechanically robust sensors that exhibit excellent long-term stabilities. The covalent photografting or plasma grafting inhibits formation of water layers at the interface of the electrode body and sensing membrane, preventing membrane delamination, and counteracts the formation of a water layer at the interface to the carbon solid contact, preventing emf signal drift. It is evident that this approach can be adapted to detect other ions by using different ionophores, provided that the ionophore is compatible with the photopolymerization. The approach appears particularly suitable for wearable and implantable sensors that require long term stability with minimal or no recalibration.

Experimental Details

Reagents and Materials. Magnesium sulfate, sodium chloride, lithium chloride, lithium hydroxide, 2,2-dimethoxy-2-phenylacetophenone, 1,6-hexanediol dimethacrylate, and 2-(diisopropylamino)ethyl methacrylate were purchased from Sigma Aldrich (St. Louis, MO, USA). Decyl methacrylate (97%) was purchased from Pfaltz & Bauer (Waterbury, CT, USA). Potassium chloride, potassium hydroxide, basic alumina, sodium hydroxide, and tetrahydrofuran were purchased from Fisher Chemical (Waltham, MA, USA). Nanographite powder (GS-4827, BET surface area of 250 m2/g, particle size distribution from 0.10 μm to 10 μm) was purchased from Graphitestore (Northbrook, IL, USA). Potassium tetrakis(pentafluorophenyl)borate (KTPFB) was purchased from Alfa Aesar (Tewksbury, MA, USA). Polypropylene sheets and poly(ethylene-co-tetrafluoroethylene) (also known under the brand name Tefzel) films were purchased from McMaster-Carr (Chicago, IL, USA). A glassy carbon plate (SPI-glas 11 grade, 50 mm×50 mm) was purchased from SPI Supplies (West Chester, PA, USA). For delamination tests, the glassy carbon plate was cut into 1×1 cm2 pieces using a rotary cutting wheel tool (Dremel, Mt. Prospect WI, USA). Decyl methacrylate, 1,6-hexanediol dimethacrylate, 2-(dimethylamino)ethyl methacrylate, 2-(diisopropylamino)ethyl methacrylate, and anhydrous inhibitor-free tetrahydrofuran (THF) was each passed through a pipet column filled with basic alumina separately before use. All aqueous solutions were prepared with deionized and charcoal-treated water (18.2 MΩ/cm specific resistance) using a Milli-Q Plus reagent-grade water system (Millipore, Bedford, MA, USA).

Contact Angle Measurements. Contact angles before and after surface modification of polypropylene substrates and poly(ethylene-co-tetrafluoroethylene) film were measured with a contact-angle goniometer (Erma, Tokyo, Japan) using the sessile drop method (R. Good, Journal of Adhesion Science and Technology 1992, 6, 1269-1302) with a drop increasing from 5 to 10, 15, and 20 μL of purified H2O to measure advancing angles, followed by three times removal of 5 μL aliquots from the droplet for the measurement of receding angles. Advancing contact angles for 10, 15, and 20 μL drops were within error identical, while the advancing angle for the 5 μL drop was slightly larger and considered to be affected by a systematic error caused by the small volume of the drop. Receding angles were within error identical for all drop volumes. Averages were calculated from the three advancing angles for 10, 15, and 20 μL drops and the 15, 10, and 5 μL drop receding angles and three different sample surfaces.

DSC: A TA Instrument Q1000 DSC (New Castle, DE) differential scanning calorimeter with a liquid nitrogen cooling system was used for all DSC measurements. The capped sample pans were thermally equilibrated at 100° C. for 1 min. Then samples were scanned to −90° C. and back to 100° C., with a 10° C./min heating and cooling rate. Glass transition temperatures were determined from the midpoints of transition zones.

Other Instrumentation. ATR-FTIR spectroscopy was performed with a UV-1800 spectrometer from Shimadzu Corporation (Canby OR, USA). Electrodes were autoclaved with a 2340M manual sterilizer from Tuttnauer (Hauppauge, NY). A 3UV lamp was purchased from Analytik Jena (Jena, Germany).

Attachment of Surface Initiator to Solid Surface. A total of 30 L of 20 wt % THF or methanol solution of 2,2-dimethoxy-2-phenylacetophenone was drop cast onto the gold electrodes coated with nanographite and the surrounding polypropylene (in four portions of 10, 10, 5, and 5 L to avoid flushing aside the nanographite). The electrodes were placed into a well-sealed box covered by a UV-transparent quartz glass plate, and the box was flushed with argon for 10 min. The photoinitiator was then grafted to the polypropylene and nanographite solid contact by UV irradiation (peak output 365 nm, with significant output in the 350 to 390 nm range) over 20 min. The electrodes were dried at room temperature in air for 1 h.

Grafting of Crosslinked PDMA onto the Functionalized Inert Polymer and Solid Contact Carbon. This procedure was analogous to the attachment of surface initiator to the inert polymers or solid contact carbon, except that besides the 2,2-dimethoxy-2-phenylacetophenone also 1.5 wt % crosslinker and 15 or 50 wt % decyl methacrylate was used (for concentrations, see Table 1).

Preparation of pH Sensing Membrane Precursor Solutions. Solutions for the preparation of PDMA membranes with covalently attached ionophore were prepared by mixing 1.5 wt % 2,2-dimethoxy-2-phenyl,acetophenone (photoinitiator), 93 wt % decyl methacrylate, 1.5 wt % 1,6-hexanediol dimethacrylate (crosslinker), 4 wt % potassium tetrakis (pentafluorophenyl)borate (ionic sites), and covalently attachable ionophore 2-(diisopropylamino)ethyl methacrylate (300 mol % with respect to the ionic sites, which corresponds to 18.2 mg per 694.7 mg of the other membrane components). No additional solvent was used.

Grafting of the pH Sensor Membrane onto the Functionalized Inert Polymer and Solid Contact Carbon. This procedure was analogous to the attachment of surface initiator to the inert polymer and solid contact carbon, except that the pH sensing membrane precursor solutions contained besides the 2,2-dimethoxy-2-phenylacetophenone solutions also ionophore, monomer and crosslinker (see preceding paragraph). A total of 30 μL (in 10, 10, 5 and 5 μL portions) of the membrane precursor solution was drop-cast onto the polypropylene area and nanographite previously activated with surface initiator.

Grafting Degree/Efficiency, and Membrane Thickness. The grafting degree, membrane thickness, and grafting efficiency were calculated as follows:

$$\text{Grafting degree} = (W1 - W0)/A \tag{1}$$

$$d = (W1 - W0)/(A\,DM) \tag{2}$$

$$\text{Grafting efficiency} = (W1 - W0)/W2 \tag{3}$$

where d is the thickness of the covalently attached PDMA film, W0 is the weight of the unmodified polymer sheet, W1 is the weight of the polymer sheet with the covalently attached PDMA film or ion-selective membrane, A is the surface area, DM is the density of monomer, and W2 is the theoretical weight increase expected if all the polymerizable components (i.e., monomer, crosslinker, and the covalently attachable ionophore, if applicable) deposited for the formation of the PDMA film or ion-selective membrane polymerized with 100% efficiency.

Potentiometry. Potentiometric measurements were carried out in stirred solutions with a EMF 16 high-impedance voltmeter controlled by EMF Suite 1.03 software (Lawson Labs, Malvern, PA, USA) against a double-junction reference electrode with AgCl-saturated 3.00 M KCl reference electrolyte and 1.0 M KCl bridge electrolyte (DX200, Mettler Toledo, Switzerland). A pH glass electrode (InLab 201, Mettler Toledo, Columbus, OH, USA) was used to separately determine the pH of aqueous solutions. To measure pH responses of ISEs, the pH of 10 mM pH 7.1 sodium phosphate buffer solutions was changed by adding aliquots of 1 M NaOH or 1 M HCl. Selectivity coefficients against Na+, K+, and Li+ were measured using the fixed interference method (FIM) (E. Bakker, E. Pretsch, P. Buhlmann, Analytical Chemistry 2000, 72, 1127-1133.) Long-term drifts test were measured relative to a capillary-based electrode (E. L. Anderson, B. K. Troudt, P. Buhlmann, ACS Sensors 2021, 6, 2211-2217) in 1.0 mM sodium phosphate buffer solution or to a Ag—Cl-coated Ag wire in 1.0 mM NaCl solution in a temperature-controlled Faraday cage at 32° C.

Figure 5:
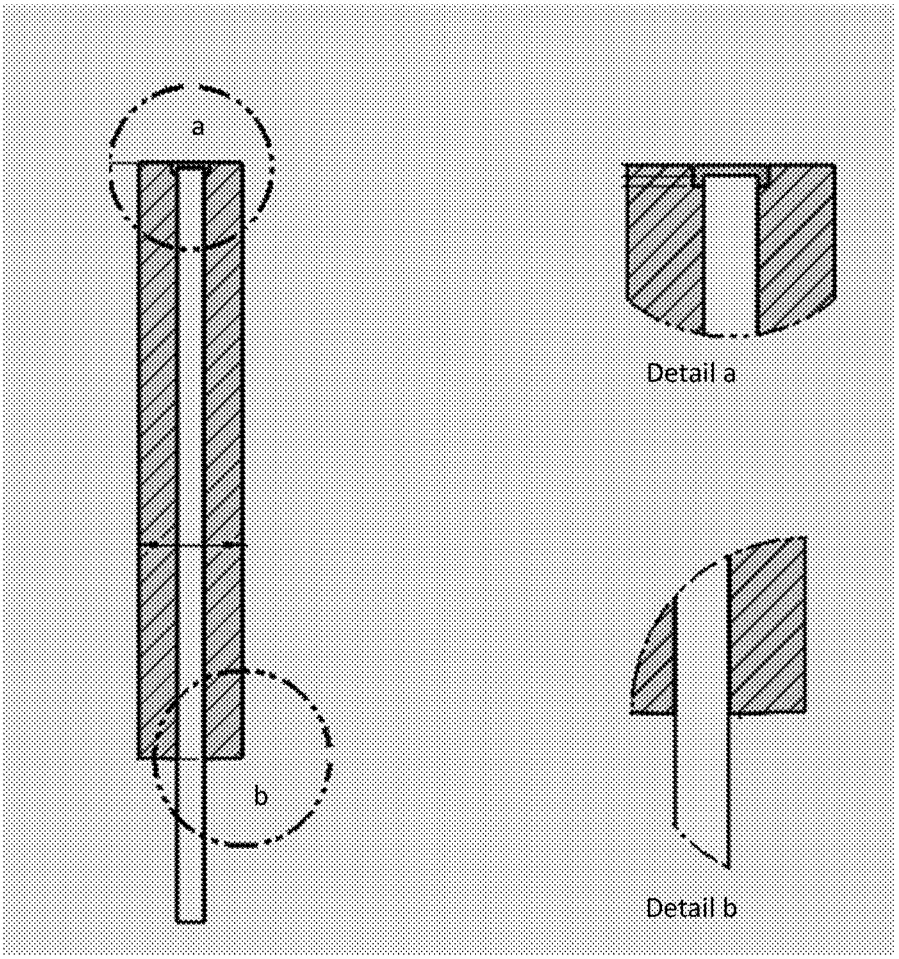
FIG. 5 is a sectional view of an example of a polypropylene-based electrode body.

Electrode Bodies. A cylindrical polypropylene-based electrode body was prepared by molding a stainless steel rod coated with gold into polypropylene, The metal rod pops out a bit from the bottom of a cavity at the end of the electrode body (see FIG. 5). This design has several advantages. First, the gold pin being protruding from the cavity but recessed from the very end of the inert electrode body was designed to make it easier to coat the pin with nanographite not only from the top but also the exposed side, which increases the surface area of the contact. Moreover, when the temperature increases, the recessed sensing membrane is mechanically pushed against the side wall of the cavity, adding to mechanical stability, and if the temperature decreases, the sensing membrane holds more tightly to the pin, again adding mechanical stability. This mechanical robustness supplements the toughness gained from the covalent attachment of the sensing membrane to the polypropylene and nanographite.

Table 1. Formation of poly(decyl methacrylate) on polypropylene substrates in a 2-step process: (1) A solution of 2,2-dimethoxy-2-phenyl-,acetophenone (photoinitiator) in tetrahydrofuran or methanol solution was drop cast onto the substrates, UV irradiated, and dried to constant weight, (2) A solution of decyl methacrylate in tetrahydrofuran or methanol was drop cast onto the polypropylene sheets, again UV irradiated, and dried to constant weight: Grafting degrees, membrane thicknesses, and grafting efficiencies were calculated from the difference in weights prior to and after the photografting. They are given here as a function of the concentrations of photoinitiator as well as of decyl methacrylate or the ion-selective membrane components in the respective solutions.

| Grafting degree | Thickness, d | Grafting efficiency | Step 1: Concentration of photoinitiator | Step 2: Concentration of decyl methacrylate |
|---|---|---|---|---|
| 1.94 ± 0.33 mg/cm$^2$ | 22 ± 4 μm | 79% ± 14% | 10 wt % | 15 wt %[a] |
| 4.05 ± 0.10 μg/cm$^2$ | 47 ± 1 μm | 41% ± 1% | 10 wt % | 50 wt %[a] |
| 6.47 ± 1.14 mg/cm$^2$ | 75 ± 4 μm | 66% ± 4% | 15 wt % | 93 wt %[b] |
| 7.95 ± 0.31 mg/cm$^2$ | 92 ± 4 μm | 81% ± 4% | 20 wt % | 93 wt %[b] |

[a]Photografting solutions contained photoinitiator, decyl methacrylate, and crosslinker.
[b]Photografting solutions contained photoinitiator, decyl methacrylate, crosslinker, ionophore, and ionic sites.

Table 2. Shows contact angles of H2O on unmodified polypropylene sheets, unmodified poly(ethylene-co-tetrafluoroethylene) films. as well as PDMA membranes attached onto polypropylene and poly(ethylene-co-tetrafluoroethylene).

| Advancing and receding contact angle for polypropylene substrates | | | | | |
|---|---|---|---|---|---|
| Advancing Contact Angle (°) | | | Receding Contact Angle (°) | | |
| Drop Volume | Unmodified polypropylene | PDMA membrane attached | Drop Volume | Unmodified polypropylene | PDMA membrane attached |
| 5 μL | 117 ± 5 | 80 ± 2 | 20 μL | 113 ± 2 | 76 ± 3 |
| 10 μL | 112 ± 2 | 76 ± 4 | 15 μL | 112 ± 2 | 76 ± 4 |
| 15 μL | 113 ± 2 | 76 ± 4 | 10 μL | 113 ± 2 | 76 ± 4 |
| 20 μL | 112 ± 2 | 76 ± 3 | 5 μL | 115 ± 3 | 81 ± 3 |

| Advancing and receding contact angles for poly(ethylene -co-tetrafluoroethylene) films | | | | | |
|---|---|---|---|---|---|
| Advancing Contact Angle (°) | | | Receding Contact Angle (°) | | |
| Drop Volume | Unmodified poly(ethylene-co-tetrafluoro-ethylene) | PDMA membrane attached | Drop Volume | Unmodified poly(ethylene-co-tetrafluoro-ethylene) | PDMA membrane attached |
| 5 μL | 107 ± 4 | 79 ± 2 | 20 μL | 106 ± 2 | 76 ± 2 |
| 10 μL | 107 ± 3 | 76 ± 3 | 15 μL | 107 ± 3 | 75 ± 3 |
| 15 μL | 106 ± 2 | 76 ± 2 | 10 μL | 106 ± 3 | 75 ± 3 |
| 20 μL | 106 ± 2 | 76 ± 2 | 5 μL | 107 ± 2 | 76 ± 2 |

Table 3 shows comparison of the initial potentiometric responses to the potentiometric response after 6 months in 10 mM sodium phosphate buffer solution (pH 7.1), as well as after exposure for heat and pressure using an autoclave (at 121° C. and 2.0 atm for 30 min) or to 10 wt % ethanol for one day.

| Exposure | Slope (mV/decade) | Working range (pH)[a] | log $K^{pot}_{H,NA^+}$ | log $K^{pot}_{H,K^+}$ | log $K^{pot}_{H,Li^+}$ |
|---|---|---|---|---|---|
| Freshly prepared electrodes | −57.3 ± 1.2 | 1.3-10.7 | −10.4 ± 0.1 | −9.8 ± 0.1 | −10.7 ± 0.1 |
| After 6 months | −58.4 ± 0.8 | 1.3-10.7 | −10.5 ± 0.1 | −9.7 ± 0.1 | −10.5 ± 0.1 |
| After heat and pressure exposure | −56.1 ± 0.5 | 1.3-10.7 | −10.3 ± 0.1 | −9.6 ± 0.2 | −10.6 ± 0.1 |
| After ethanol exposure | −57.0 ± 0.9 | 1.3-10.7 | −10.2 ± 0.1 | −9.8 ± 0.1 | −10.6 ± 0.1 |
| PDMA membranes with covalently attached ionophore, but no covalent attachment of the membrane to the underlying substrate and carbon [59] | −58.7 ± 0.5 | 1.8-11.0 | −11.0 ± 0.3 | −10.7 ± 0.3 | −10.3 ± 0.1 |

[a]The working range is determined here by the intersection of the Nernstian (linear) region and constant (plateau) emf region at the lower or upper detection limits.

What is claimed is:

1. An electrochemical sensor comprising an ion-selective membrane, an electrically non-conducting polymer substrate or electrode body and an underlying electron conductor, the ion-selective membrane being attached through covalent chemical bonds simultaneously to one of the electrically non-conducting polymer substrate or electrode body, and the underlying electron conductor wherein said covalent chemical bonds comprise an interfacial polymer layer formed of cross-linked poly(decyl methacrylate) chains covalently bonded to both the electrically non-conducting polymer substrate or electrode body and the underlying electron conductor, the poly(decyl methacrylate) chains including benzoyl-derived linkages produced by photoinitiated surface functionalization and photoinitiated graft polymerization, the interfacial polymer layer having a thickness of about 20 to 100 μm and providing direct covalent continuity between the ion-selective membrane and both the electrically non-conducting polymer substrate or the electrode body and the underlying electron conductor.

2. The electrochemical sensor of claim 1 wherein the covalent chemical bonds comprise a two-step photo-initiated sequence of (1) surface functionalization with benzoyl groups attached to the electrically non-conducting polymer substrate or electrode body and the underlying electron conductor and (2) graft polymerization of decyl methacrylate initiated from the benzoyl groups to form the interfacial polymer layer.

3. The electrochemical sensor of claim 1 wherein the interfacial polymer layer is further characterized by polymerization initiated by surface radicals produced through a plasma treatment, the plasma-generated radicals forming covalent carbon-oxygen-carbon linkages that bond the polymer layer to both the electrically non-conducting polymer substrate or electrode body and the underlying electron conductor.

4. The electrochemical sensor of claim 3 wherein the plasma treatment comprises pretreatment of the electrically non-conducting polymer substrate or electrode body and the underlying electron conductor with a plasma comprising argon, helium, oxygen, hydrogen peroxide, hydrogen, chlorine, $BCl_3$, HBr, tetrafluoromethane, fluoroform, $CO_2$, $SF_6$, a fluorocarbon, or a mixture of two thereof, said plasma producing reactive surface radicals that covalently bond to the interfacial polymer layer.

5. The electrochemical sensor of claim 4 wherein the electrically non-conducting polymer substrate or electrode body and the underlying electron conductor include peroxide and hydroperoxide functional groups covalently bonded to their surfaces, said functional groups providing attachment sites for the interfacial polymer layer.

6. The electrochemical sensor of claim 3 wherein the interfacial polymer layer is formed by polymerization of a monomer introduced in liquid or vapor phase during the plasma treatment, the resulting polymer being covalently bonded to both the electrically non-conducting polymer substrate or electrode body and the underlying electron conductor.

7. The electrochemical sensor of claim 1 wherein the ion-selective membrane comprises a poly(decyl methacrylate) matrix incorporating an ionophore containing a tertiary amine and ionic sites containing tetraphenylborate groups, the ionophore being covalently incorporated into the polymer backbone.

8. The electrochemical sensor of claim 7 wherein the ion-selective membrane exhibits a pH response slope of about −58±1 mV per decade over a pH range of 1.4 to 10 and a logarithmic selectivity coefficient log $K^+$(H,K)^pot of about −9.8±0.1.

9. The electrochemical sensor of claim 1 wherein the interfacial polymer layer and ion-selective membrane are covalently attached to a carbon-based electron conductor comprising nanographite having a surface area of about 250 $m^2/g$ and particle size distribution of 0.1 to 10 μm.

10. The electrochemical sensor of claim 9 wherein the electrically non-conducting polymer substrate or electrode body comprises polypropylene or poly(ethylene-co-tetrafluoroethylene), the electrically non-conducting polymer substrate or the electrode body providing mechanical and thermal stability for the covalently attached ion-selective membrane.

11. The electrochemical sensor of claim 1 further comprising a covalently attached ion-selective membrane layer in direct contact with the interfacial polymer layer, the ion-selective membrane layer including an ionophore covalently bonded to the polymer backbone and ionic sites providing charge balance.

12. The electrochemical sensor of claim 1, wherein the interfacial polymer layer has a grafting efficiency of at least 60% and a thickness of 20 to 100 μm as determined by a difference in weight (W1-W0) per unit area.

13. The electrochemical sensor of claim 1, wherein the poly(decyl methacrylate) interfacial layer contains benzoyl functional groups detectable by ATR-FTIR absorbance near 1710 $cm^{-1}$ and C—H stretch bands characteristic of benzoyl-derived linkages.

14. The electrochemical sensor of claim 13, wherein the interfacial polymer layer comprises cross-linker 1,6-hexanediol dimethacrylate in an amount of about 1.5 wt % relative to a decyl methacrylate monomer used to form the interfacial polymer layer.

15. The electrochemical sensor of claim 1 wherein the interfacial polymer layer is formed on a gold-coated stainless-steel rod molded into a polypropylene body, the rod providing an electrical connection to the underlying electron conductor.

16. The electrochemical sensor of claim 15 wherein the sensing membrane is mechanically recessed within a cavity of the polypropylene body, providing mechanical stability during thermal cycling.

17. The electrochemical sensor of claim 16 wherein the interfacial polymer layer and ion-selective membrane maintain adhesion and selectivity after exposure to 10 wt % ethanol solution for approximately one day.

18. A reference electrode comprising an ionically conductive polymer matrix covalently bonded to an electron conductor through an interfacial polymer layer comprising cross-linked poly(decyl methacrylate), the interfacial polymer layer providing covalent continuity between the ionically conductive polymer matrix and the electron conductor.

19. The reference electrode of claim 18 wherein the electron conductor comprises glassy carbon or nanographite having a surface area of about 250 $m^2/g$, the interfacial polymer layer forming covalent carbon-oxygen linkages to the surface atoms thereof.

20. The reference electrode of claim 18 wherein the ionically conductive polymer matrix comprises a cross-linked poly(methacrylate) network containing quaternary ammonium sites providing ionic conduction independent of external pressure or fluid flow.

21. The reference electrode of claim 20 wherein the poly(methacrylate) network has a glass-transition temperature between −65° C. and +12° C. as measured by differential scanning calorimetry.

22. The reference electrode of claim 20 wherein the covalent attachment of the ionically conductive polymer matrix and the interfacial polymer layer provides long-term potential stability with an emf drift less than 10 μV/h, after 260 hours of operation.

23. The reference electrode of claim 22 wherein the electron conductor and the ionically conductive polymer matrix are bonded through a PDMA interfacial layer that retains adhesion after autoclave exposure to 121° C. and 1500 Torr.

24. The reference electrode of claim 18 wherein the interfacial polymer layer excludes any aqueous layer between the ionically conductive polymer matrix and the electron conductor, thereby preventing potential drift due to water-layer formation.

* * * * *